US008378004B2

(12) United States Patent
Angermaier et al.

(10) Patent No.: US 8,378,004 B2
(45) Date of Patent: Feb. 19, 2013

(54) PROCESS FOR THE PRODUCTION OF SILICONE COATINGS AND SILICONE MOLDINGS FROM PHOTOCROSSLINKABLE SILICONE MIXTURES

(75) Inventors: Klaus Angermaier, Munich (DE); Philipp Mueller, Burghausen (DE)

(73) Assignee: Wacker Chemie AG, Munich (DE)

( * ) Notice: Subject to any disclaimer, the term of this patent is extended or adjusted under 35 U.S.C. 154(b) by 168 days.

(21) Appl. No.: 12/819,275

(22) Filed: Jun. 21, 2010

(65) Prior Publication Data
US 2011/0003906 A1    Jan. 6, 2011

(30) Foreign Application Priority Data
Jul. 6, 2009   (DE) .......................... 10 2009 027 486

(51) Int. Cl.
*C08F 2/50*        (2006.01)
*C08J 3/28*        (2006.01)
(52) U.S. Cl. ............ 522/99; 522/66; 522/148; 522/172; 522/134; 522/135; 522/145; 522/162
(58) Field of Classification Search .................... 522/66, 522/99, 148, 172, 134, 135, 145, 162; 427/508, 427/510, 487, 496, 503, 515
See application file for complete search history.

(56) References Cited

U.S. PATENT DOCUMENTS

| | | | |
|---|---|---|---|
| 4,603,168 A * | 7/1986 | Sasaki et al. .................... | 522/18 |
| 4,916,169 A | 4/1990 | Boardman et al. | |
| 6,150,546 A | 11/2000 | Butts | |
| 6,251,969 B1 | 6/2001 | Woerner et al. | |
| 7,314,770 B2 * | 1/2008 | Boardman et al. .............. | 438/30 |
| 7,595,515 B2 * | 9/2009 | Thompson et al. ........... | 257/103 |
| 2003/0027003 A1 | 2/2003 | Nakamura | |
| 2006/0105481 A1 * | 5/2006 | Boardman et al. .............. | 438/22 |
| 2007/0141739 A1 * | 6/2007 | Thompson et al. ............. | 438/28 |

FOREIGN PATENT DOCUMENTS

| | | |
|---|---|---|
| DE | 689 29 120 T2 | 6/2000 |
| DE | 600 12 611 T2 | 8/2005 |
| EP | 1 006 147 A1 | 11/1999 |
| WO | 2010049388 A1 | 5/2010 |

* cited by examiner

*Primary Examiner* — Sanza McClendon
(74) *Attorney, Agent, or Firm* — Brooks Kushman P.C.

(57) ABSTRACT

Silicone coatings and moldings are produced from a photocrosslinkable silicone mixture which contains
(A) a polyorganosiloxane containing at least two carbon-carbon multiple bonds,
(B) an organosilicon compound containing at least two SiH functions, and
(C) a cyclopentadienyl-platinum complex catalyst be activatable by light of 200 to 500 nm,
wherein the mixture is heated to 40° C. to 250° C., and then irradiated with light of 200 to 500 nm wavelength.

4 Claims, No Drawings

PROCESS FOR THE PRODUCTION OF SILICONE COATINGS AND SILICONE MOLDINGS FROM PHOTOCROSSLINKABLE SILICONE MIXTURES

CROSS-REFERENCE TO RELATED APPLICATIONS

This application claims priority to German Patent Application No. DE 10 2009 027 486.3 filed Jul. 6, 2009 which is herein incorporated by reference.

BACKGROUND OF THE INVENTION

1. Field of the Invention

The invention relates to a process for the production of silicone coatings and silicone moldings from photocrosslinkable silicone mixtures.

2. Background Art

In many applications in the electrical and electronics industry, it is desired to work with silicone elastomers which have as low a viscosity as possible. This is the case typically when either very narrow geometrical regions of a component are to be filled with casting compound, the surface to be coated or cast must be wet as quickly as possible, or material is to be applied in very thin layers. The latter case may be desirable in particular for cost reasons.

Commercially available, low-viscosity, solvent-free coating materials reach low processing viscosities in the neighborhood of 100 mPa·s (Dow Corning HC-2000: 130 mPa·s; Dow Corning 3-1965: 110 mPa·s; "Information über Dow Corning Schutzlacke [Information about Dow Corning protective lacquers], 1999-2005"). Mixtures having even lower viscosities could potentially be prepared by using oligomeric alkyl- and alkenylsiloxanes. However, this cannot be realized in practice since the mechanical properties of such mixtures no longer meet the requirements for use.

Nevertheless, lacquers (urethane- or epoxy-based) having viscosities of 10 mPa·s or less are used for the circuit board coating application. Such low viscosities can be achieved with conventional silicone mixtures only by using organic solvents, which however is not expedient for reasons of workplace safety and environmental protection.

SUMMARY OF THE INVENTION

It is an object of the invention to improve upon the prior art, and in particular to produce silicone coatings and silicone moldings as rapidly as possible. These and other objects are achieved by application of a photocurable silicone mixture containing an organopolysiloxane bearing at least two radicals containing aliphatic carbon-carbon multiple bonds, an organosilicon compound bearing at least two Si—H functions, and a cyclopentadienyl platinum complex which is activatable by light of wavelength(s) between 200 and 500 nm.

DETAILED DESCRIPTION OF THE PREFERRED EMBODIMENT(S)

The invention thus relates to a process for the production of silicone coatings and silicone moldings, in which
1) a photocrosslinkable silicone mixture is supplied, the mixture containing at least one polyorganosiloxane (A) of the average general formula (1)

$$R^1_x R^2_y SiO_{(4-x-y)/2} \qquad (1),$$

in which
$R^1$ denotes a monovalent, optionally halogen- or cyano-substituted, $C_1$-$C_{10}$-hydrocarbon radical which is optionally bonded to silicon via an organic divalent group and contains aliphatic carbon-carbon multiple bonds,
$R^2$ denotes a monovalent, optionally halogen- or cyano-substituted $C_1$-$C_{10}$-hydrocarbon radical which is bonded via SiC and is free of aliphatic carbon-carbon multiple bonds,
x denotes a nonnegative number such that at least two radicals $R^1$ are present in each molecule and
y denotes a nonnegative number such that (x+y) is on average in the range from 1.8 to 2.5;
(B) an organosilicon compound containing at least two SiH functions per molecule; and
(C) a cyclopentadienyl-platinum complex catalyst which can be activated by light of 200 to 500 nm is applied and is heated to 40° C. to 250° C. before or after the application, and
2) the silicone mixture and complex catalyst is then irradiated with light of 200 to 500 nm.

The present invention makes use of the temperature dependence of the viscosity of silicone polymers. If a silicone polymer or a mixture thereof is heated, the viscosity decreases; thus, the viscosity of a PDMS oil decreases from a viscosity of 100 mPa·s to 30 mPa·s if it is heated from 25° C. to 100° C. It is therefore possible to process a silicone mixture having a reduced viscosity when the temperature of the mixture is correspondingly increased. However, this principle cannot be applied in the case of the known addition-crosslinking, non-UV-crosslinking silicones since these materials would rapidly crosslink at elevated temperatures and therefore would no longer be processable.

By using UV-crosslinkable silicones, which at the same time are not thermally crosslinkable in the absence of light, it is possible to substantially reduce the viscosity of silicone mixtures having comparatively high starting viscosity at room temperature (and hence enhanced, better mechanical properties) by supplying heat, and to improve their processability thereby without at the same time curing them. The curing then takes place by exposure to light as soon as the silicone is applied to the areas desired by the processor.

A precondition for the success of the invention is the use of platinum catalysts which do not lead to activation of the hydrosilylation process even at relatively high temperature, but are activated only by UV light exposure.

These silicone mixtures can be heated, for example, to a temperature of 150° C. for some hours without undergoing vulcanization. During the processing, it may be advantageous not only to heat the silicone mixture but also to preheat the component or substrate appropriately.

The irradiation of the shaped silicone mixture with light preferably lasts for at least 1 second, more preferably at least 5 seconds and preferably not more than 500 seconds, more preferably not more than 100 seconds. The crosslinking of the silicone mixture begins as a result of the onset of the hydrosilylation reaction, and the silicone mixture gels.

The silicone mixture preferably has a viscosity [D=0.5/25° C.] of 100 to 2,000,000 mPa·s, more preferably 1000 to 20,000 mPa·s, and in particular not more than 100,000 mPa·s.

The silicone mixture which is crosslinkable by light of 200 to 500 nm comprises polyorganosiloxane (A) which corresponds to the average general formula (1)

$$R^1_x R^2_y SiO_{(4-x-y)/2} \qquad (1),$$

in which
$R^1$ denotes a monovalent, optionally halogen- or cyano-substituted, $C_1$-$C_{10}$-hydrocarbon radical which is optionally bonded to silicon via an organic divalent group and contains aliphatic carbon-carbon multiple bonds, $R^2$ denotes a monovalent, optionally halogen- or cyano-substituted $C_1$-$C_{10}$-hydrocarbon radical which is bonded via SiC and is free of aliphatic carbon-carbon multiple bonds, x denotes a nonnegative number such that at least two radicals $R^1$ are present in each molecule and y denotes a nonnegative number such that (x+y) is on average in the range from 1.8 to 2.5.

The alkenyl groups $R^1$ are accessible to an addition reaction with an SiH-functional crosslinking agent. Usually, alkenyl groups having 2 to 6 carbon atoms, such as vinyl, allyl, methallyl, 1-propenyl, 5-hexenyl, ethynyl, butadienyl, hexadienyl, cyclopentenyl, cyclopentadienyl, and cyclohexenyl, preferably vinyl and allyl, are used.

Organic divalent groups via which the alkenyl groups $R^1$ can be bonded to silicon of the polymer chain consist, for example, of oxyalkylene units such as those of the general formula (2)

in which m denotes the values 0 or 1, in particular 0, n denotes values from 1 to 4, in particular 1 or 2 and o denotes values from 1 to 20, in particular from 1 to 5.

The oxyalkylene units of the general formula (2) are bonded on the left to a silicon atom. The radicals $R^1$ may be bonded in any position of the polymer chain, in particular to the terminal silicon atoms.

Examples of unsubstituted radicals $R^2$ are alkyl radicals such as the methyl, ethyl, n-propyl, isopropyl, n-butyl, isobutyl, tert-butyl, n-pentyl, isopentyl, neopentyl and tert-pentyl radicals, hexyl radicals such as the n-hexyl radical, heptyl radicals such as the n-heptyl radical, octyl radicals such as the n-octyl radical, and isooctyl radicals such as the 2,2,4-trimethylpentyl radical, nonyl radicals such as the n-nonyl radical, and decyl radicals such as the n-decyl radical; alkenyl radicals such as the vinyl, allyl, n-5-hexenyl, 4-vinylcyclohexyl and 3-norbornenyl radicals; cycloalkyl radicals such as the cyclopentyl, cyclohexyl, 4-ethylcyclohexyl, and cycloheptyl radicals, norbornyl radicals and methylcyclohexyl radicals; aryl radicals such as the phenyl, biphenyl and naphthyl radicals; alkaryl radicals such as o-, m- and p-tolyl radicals and ethylphenyl radicals; and aralkyl radicals such as the benzyl radical and the alpha- and the β-phenylethyl radicals.

Examples of substituted hydrocarbon radicals as radicals $R^2$ are halogenated hydrocarbons, such as the chloromethyl, 3-chloropropyl, 3-bromopropyl, 3,3,3-trifluoropropyl and 5,5,5,4,4,3,3-hexafluoropentyl radical and the chlorophenyl, dichlorophenyl and trifluorotolyl radicals. $R^2$ preferably has 1 to 6 carbon atoms. Methyl and phenyl are particularly preferred.

Constituent (A) may also be a mixture of different polyorganosiloxanes which contain alkenyl groups and differ, for example, in the alkenyl group content, the type of alkenyl group or structurally.

The structure of the polyorganosiloxanes (A) containing alkenyl groups may be straight-chain, cyclic or branched. The content of tri- and/or tetrafunctional units leading to branched polyorganosiloxanes is typically very low, preferably not more than 20 mol %, in particular not more than 0.1 mol %.

The use of polydimethylsiloxanes which contain vinyl groups and whose molecules correspond to the general formula (3)

in which the nonnegative integers p and q fulfill the following relationships: p≧0, 50<(p+q)<20,000, preferably 200<(p+q)<1000, and 0<(p+1)/(p+q)<0.2, is particularly preferred.

The viscosity of the polyorganosiloxane (A) is preferably 0.5 to 100,000 Pa·s, more preferably 1 to 2000 Pa·s, at 25° C.

The organosilicon compound (B) containing at least two SiH functions per molecule preferably has a composition of the general formula (4)

in which

R is a monovalent, optionally halogen- or cyano-substituted $C_1$-$C_{18}$-hydrocarbon radical which is bonded via SiC and is free of aliphatic carbon-carbon multiple bonds, h is 0, 1 or 2, o is 0 or an integer from 1 to 1000, p is an integer from 1 to 1000, and x is 1 or 2.

Examples of R are the radicals stated for $R^2$. R preferably has 1 to 6 carbon atoms. Methyl and phenyl are particularly preferred.

The use of an organosilicon compound (B) containing three or more SiH bonds per molecule is preferred. With the use of an organosilicon compound (B) having only two SiH bonds per molecule, the use of a polyorganosiloxane (A) which has at least three alkenyl groups per molecule is advisable.

The hydrogen content of the organosilicon compound (B), which is based exclusively on the hydrogen atoms bonded directly to silicon atoms, is preferably in the range from 0.002 to 1.7% by weight of hydrogen, preferably from 0.1 to 1.7% by weight of hydrogen.

The organosilicon compound (B) preferably contains at least three and not more than 600 silicon atoms per molecule. The use of organosilicon compounds (B) which contains 4 to 200 silicon atoms per molecule is preferred. The structure of the organosilicon compound (B) may be straight-chain, branched, cyclic or network-like.

Particularly preferred organosilicon compounds (B) are straight-chain polyorganosiloxanes of the general formula (5)

in which $R^4$ has the meanings of R and the nonnegative integers c, d, e and f fulfill the following relationships: (c+d)=2, (c+e)>2, 5<(e+f)<200 and 1<e/(e+f)<0.1.

The SiH-functional organosilicon compound (B) is preferably present in the crosslinkable silicone material in an amount such that the molar ratio of SiH groups to alkenyl groups is from 0.5 to 5, in particular from 1.0 to 3.0.

Suitable catalysts (C) are cyclopentadienyl complexes of platinum, preferably of the general formula (6),

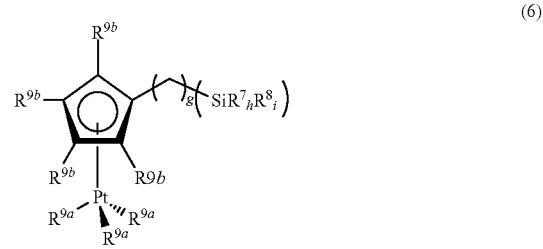

in which
g=1 to 8,
h=0 to 2,
i=1 to 3, $R^7$, independently of one another, are identical or different and denote a monovalent, unsubstituted or substituted, straight-chain, cyclic or branched hydrocarbon radical containing aliphatically saturated or unsaturated or aromatically unsaturated radicals and having 1 to 30 carbon atoms, in which individual carbon atoms may be replaced by O, N, S or P atoms, $R^8$, independently of one another, are identical or different and denote hydrolyzable functional groups selected from the group consisting of carboxyl —O—C(O)$R^{10}$, oxime —O—N=$CR^{10}{}_2$, alkoxy —$OR^{10}$, alkenyloxy —O—$R^{12}$ amide —$NR^{10}$—C(O)$R^{11}$, amine —$NR^{10}R^{11}$, aminoxy —O—$NR^{10}R^{11}$, where $R^{10}$, independently of one another, are identical or different and denote H, alkyl, aryl, arylalkyl, alkylaryl, $R^{11}$, independently of one another, are identical or different and denote alkyl, aryl, arylalkyl, alkylaryl, $R^{12}$ denotes a straight-chain or branched, aliphatically unsaturated organic radical, $R^{9a}$, independently of one another, are identical or different and denote alkyl, aryl, arylalkyl, alkylaryl having 1 to 30 carbon atoms, it being possible for the hydrogens to be substituted by -Hal or —$SiR_3{}^9$, where $R^9$, independently of one another, are identical or different and denote a monovalent, unsubstituted or substituted, straight-chain, cyclic or branched hydrocarbon radical, and $R^{9b}$, independently of one another, are identical or different and denote hydrogen or a monovalent, unsubstituted or substituted, straight-chain or branched hydrocarbon radical containing aliphatically saturated or unsaturated or aromatically unsaturated radicals and having 1 to 30 carbon atoms, in which individual carbon atoms may be replaced by O, N, S or P atoms and which may form rings fused to the cyclopentadienyl radical.

Preferred radicals $R^7$ are straight-chain saturated hydrocarbon radicals having 1 to 8 carbon atoms. Furthermore, the phenyl radical is preferred.

Preferred radicals $R^8$ are methoxy, ethoxy, acetoxy and 2-methoxyethoxy groups.

Preferred radicals $R^{9a}$ are straight-chain and branched, optionally substituted alkyl radicals, such as methyl, ethyl, propyl or butyl radicals.

Preferred radicals $R^{9b}$ are straight-chain and branched, optionally substituted straight-chain alkyl radicals, such as methyl, ethyl, propyl or butyl radicals. Furthermore, optionally further substituted fused rings, such as, for example, the indenyl or the fluorenyl radical, are preferred.

The methylcyclopentadienyltrimethylplatinum complex (MeCp(PtMe$_3$)) is particularly preferred as catalyst (C).

Catalyst (C) can be used in any desired form, for example also in the form of microcapsules containing a hydrosilylation catalyst, or organopolysiloxane particles, as described in EP-A-1006147.

The content of hydrosilylation catalysts (C) is preferably chosen so that the silicone mixture has a content of metal of the platinum group of 0.1-200 ppm, preferably of 0.5-40 ppm.

The silicone mixture is preferably transparent and free of light-absorbing fillers. However, the silicone mixture may also contain a filler (D). Examples of non-reinforcing fillers (D) are fillers having a BET surface area of up to 50 m$^2$/g, such as quartz, diatomaceous earth, calcium silicate, zirconium silicate, zeolites, metal oxide powder, such as aluminum, titanium, iron or zinc oxides or mixed oxides thereof, barium sulfate, calcium carbonate, gypsum, silicon nitride, silicon carbide, boron nitride and glass and plastic powders. Reinforcing fillers, i.e. fillers having a BET surface area of at least 50 m$^2$/g, are, for example, pyrogenically prepared silica, precipitated silica, carbon black, such as furnace black and acetylene black, and mixed silicon aluminum oxides having a large BET surface area. Fibrous fillers are, for example, asbestos and plastic fibers. The fillers may be hydrophobized, for example by treatment with organosilanes or organosiloxanes or by etherification of hydroxyl groups to give alkoxy groups. It is possible to use one type of filler and a mixture of at least two fillers may also be used. If the silicone mixtures contain filler (D), the proportion thereof is preferably 2 to 60% by weight, in particular 5 to 50% by weight, based on the total silicone material.

The silicone mixtures may contain, as constituent (E), further additives in a proportion of up to 70% by weight, preferably 0.0001 to 40% by weight, based on the total silicone material. These additives may be, for example, resin-like polyorganosiloxanes which differ from the diorganopolysiloxanes (A) and (B), dispersants, solvents, adhesion promoters, pigments, dyes, plasticizers, organic polymers, heat stabilizers, etc. These include additives such as dyes, pigments, etc. Furthermore, thixotropic constituents, such as highly divided silica or other commercially available thixotropic additives, may be present as constituent (E).

In addition, siloxanes of the formula HSi(CH$_3$)$_2$—[O—Si(CH$_3$)$_2$]$_w$—H may also be present as chain extenders, w denoting values from 1 to 1000.

Furthermore, additives (F), which serve for targeted adjustment of the processing time, initiation temperature and rate of crosslinking of the silicone mixture, may be present. These inhibitors and stabilizers are very well known in the area of the crosslinking materials.

In addition, additives which improve the compression set can also be added. In addition, hollow bodies can also be added. In addition, blowing agents for generating foams can also be added. In addition, non-vinyl-functionalized polydiorganosiloxanes can also be added.

The compounding of the silicone mixture is effected by mixing of the abovementioned components in any desired order.

Preferred embodiments of the process are applications in the electronics industry and the casting and coating of electronic components.

The invention also relates to silicone coatings and silicone moldings which are obtainable by the process according to the invention.

All above symbols of the above formulae have their meanings in each case independently of one another. In all formulae, the silicon atom is tetravalent.

In the following examples, unless stated otherwise in each case, all quantity and percentage data are based on weight, all pressures are 0.10 MPa (abs.) and all temperatures are 20° C.

EXAMPLES

Silicone Mixture A

|  | Parts |
| --- | --- |
| Vinyl polymer 200 | 65 |
| PDMS oil (oil AK 50) | 30 |
| H-Siloxane | 5 |
| Platinum catalyst | 0.01 |

Material Properties

|  | Value [mPa · s] |
| --- | --- |
| Viscosity [25° C.] | 170 |
| Viscosity [100° C.] | 50 |
| Viscosity [175° C.] | 22 |

Silicone Mixture B

|  | Parts |
| --- | --- |
| Vinyl polymer 1000 | 92 |
| H-Siloxane | 8 |
| Platinum catalyst | 0.01 |

Material Properties

|  | Value [mPa · s] |
| --- | --- |
| Viscosity [25° C.] | 950 |
| Viscosity [125° C.] | 200 |

The following are applicable above:
for vinyl polymer 1000: $ViMe_2SiO\text{-}(Me_2SiO)n\text{-}SiMe_2Vi$ where n=200
for vinyl polymer 200: $ViMe_2SiO\text{-}(Me_2SiO)n\text{-}SiMe_2Vi$ where n=95
oil AK 50: $Me_3SiO\text{-}(Me_2SiO)n\text{-}SiMe_3$ where n=40
for H-siloxane: $Me_rH_{(3-r)}SiO\text{-}(MeHSiO)_p\text{-}(Me_2SiO)_q\text{-}SiMe_rH_{(3-r)}$ where r=2 or 3 and p+q=50
for platinum catalyst: $MeCp(PtMe_3)$ An electronic component measuring 50×50 mm is completely covered with the abovementioned silicone mixture A. The component is a plug connector in which the bottom to be cast is bounded by a wall.

In the first experiment, the material is applied to the component at a temperature of 25° C. by means of a metering apparatus. Within 14 sec., the bottom of the component is completely covered; 2.2 grams of silicone are applied thereby.

In the second experiment, the material is applied at a temperature of 100° C. to the correspondingly preheated component. Within 8 sec., the bottom is completely covered; 1.4 grams of silicone are applied thereby.

In both cases, the silicone is then cured by means of UV light.

An electronic component measuring 50×50 mm is completely covered with the abovementioned silicone mixture B. The component is a plug connector in which the bottom to be cast is bounded by a wall.

In the first experiment, the material is applied to the component at a temperature of 25° C. by means of a metering apparatus. Within 30 sec., the bottom of the component is completely covered; 2.2 grams of silicone are applied thereby.

In the second experiment, the material is applied at a temperature of 125° C. to the correspondingly preheated component. Within 16 sec., the bottom is completely covered; 1.8 grams of silicone are applied thereby.

In both cases, the silicone is then cured by means of UV light.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for the production of silicone coatings and silicone moldings, comprising:
   1) providing a photocrosslinkable silicone mixture which contains
      (A) at least one polyorganosiloxane of the average formula (1)

$$R^1_x R^2_y SiO_{(4-x-y)/2} \tag{1}$$

in which
      $R^1$ is a monovalent, optionally halogen- or cyano-substituted, $C_1$-$C_{10}$-hydrocarbon radical which is optionally bonded to silicon via an organic divalent group and contains at least one aliphatic carbon-carbon multiple bond,
      $R^2$ is a monovalent, optionally halogen- or cyano-substituted $C_1$-$C_{10}$-hydrocarbon radical which is bonded via SiC and is free of aliphatic carbon-carbon multiple bonds,
      x is a nonnegative number such that at least two radicals $R^1$ are present in each molecule and
      y is a nonnegative number such that (x+y) is on average in the range of from 1.8 to 2.5,
      (B) at least one organosilicon compound containing at least two SiH functions per molecule, and
      (C) a cyclopentadienyl-platinum complex catalyst which can be activated by light of 200 to 500 nm;
   2) heating the photocrosslinkable mixture to 40° C. to 250° C., and
   3) irradiating the silicone mixture with light having a wavelength of from 200 to 500 nm, whereby the mixture is thereby crosslinked, wherein the complex catalyst comprises a cyclopentadienyl complex of platinum of the formula (6)

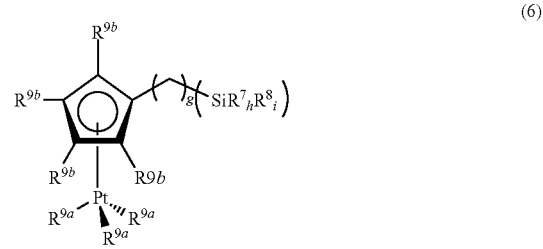

(6)

in which
g=1 to 8,
h=0 to 2,
i=1 to 3, $R^7$, independently of one another, are identical or different and denote a monovalent, unsubstituted or substituted, straight-chain, cyclic or branched hydrocarbon radical containing aliphatically saturated or unsaturated or aromatically unsaturated radicals and having 1 to 30 carbon atoms, in which individual carbon atoms may be replaced by O, N, S or P atoms, $R^8$, independently of one another, are identical or different and denote hydrolyzable functional groups selected from the group consisting of carboxyl-O—C(O)$R^{10}$,
oxime —O—N=$CR^{10}_2$,
alkoxy —$OR^{10}$,
alkenyloxy —O—$R^{12}$
amide —$NR^{10}$—C(O)$R^{11}$,
amine —$NR^{10}R^{11}$,
aminoxy —O—$NR^{10}R^{11}$, where $R^{10}$, independently of one another, are identical or different and denote H, alkyl, aryl, arylalkyl, alkylaryl, $R^{11}$, independently of one another, are identical or different and denote alkyl, aryl, arylalkyl, alkylaryl, $R^{12}$ is a straight-chain or branched, aliphatically unsaturated organic radical, $R^{9a}$, independently of one another, are identical or different and denote alkyl, aryl, arylalkyl, alkylaryl having 1 to 30 carbon atoms, it being optionally substituted by -Hal or —$SiR_3^9$, where $R^9$, independently of one another, are identical or different and denote a monovalent, unsubstituted or substituted, straight-chain, cyclic or branched hydrocarbon radical, and $R^{9b}$, independently of one another, are identical or different and denote hydrogen or a monovalent, unsubstituted or substituted, straight-chain or branched hydrocarbon radical containing aliphatically saturated or unsaturated or aromatically unsaturated radicals and having 1 to 30 carbon atoms, in which individual carbon atoms may be replaced by O, N, S or P atoms and which may form rings fused to the cyclopentadienyl radical.

2. The process of claim 1, wherein at least one organosilicon compound (B) containing at least two SiH functions per molecule has a composition of the formula (4)

$$H_h R_{3-h} SiO(SiR_2O)_o(SiR_{2-x}H_xO)_p SiR_{3-h}H_h \qquad (4)$$

in which

R is a monovalent, optionally halogen- or cyano-substituted $C_1$-$C_{18}$-hydrocarbon radical which is bonded via SiC and is free of aliphatic carbon-carbon multiple bonds, h is 0, 1 or 2,
o is 0 or an integer from 1 to 1000,
p is an integer from 1 to 1000 and
x is 1 or 2.

3. The process of claim 1, wherein at least one polyorganosiloxane (A) of the average formula (1) is a polydimethylsiloxane which contains vinyl groups, of the formula (3)

$$(ViMe_2SiO_{1/2})_2(ViMeSiO)_p(Me_2SiO)_q \qquad (3),$$

in which the nonnegative integers p and q fulfill the relationships: $p \geq 0$, $50 < (p+q) < 20{,}000$.

4. The process of claim 2, wherein at least one polyorganosiloxane (A) of the average formula (1) is a polydimethylsiloxane which contains vinyl groups and whose molecules correspond to the formula (3)

$$(ViMe_2SiO_{1/2})_2(ViMeSiO)_p(Me_2SiO)_q \qquad (3),$$

in which the nonnegative integers p and q fulfill the relationships: $p \geq 0$, $50 < (p+q) < 20{,}000$.

\* \* \* \* \*